(12) United States Patent
Goldstein

(10) Patent No.: US 7,044,073 B2
(45) Date of Patent: May 16, 2006

(54) METHODS FOR REDUCING THE VISCOUS DRAG ON A SURFACE AND DRAG REDUCING DEVICE

(75) Inventor: David B. Goldstein, Austin, TX (US)

(73) Assignee: Board of Regents of The University of Texas System, Austin, TX (US)

( * ) Notice: Subject to any disclaimer, the term of this patent is extended or adjusted under 35 U.S.C. 154(b) by 43 days.

(21) Appl. No.: 10/424,303

(22) Filed: Apr. 28, 2003

(65) Prior Publication Data

US 2004/0069195 A1    Apr. 15, 2004

Related U.S. Application Data

(60) Provisional application No. 60/375,878, filed on Apr. 26, 2002.

(51) Int. Cl.
*B63B 1/34* (2006.01)
(52) U.S. Cl. .................................... 114/67 A
(58) Field of Classification Search .............. 114/67 R, 114/67 A
See application file for complete search history.

(56) References Cited

U.S. PATENT DOCUMENTS

| | | | |
|---|---|---|---|
| 3,213,819 A | 10/1965 | May | |
| 3,650,235 A * | 3/1972 | Swanson | 114/67 A |
| 3,957,008 A * | 5/1976 | McCormick et al. | 114/67 A |
| 4,776,535 A * | 10/1988 | Paterson et al. | 244/130 |
| 5,171,623 A | 12/1992 | Yee | |
| 5,238,434 A | 8/1993 | Moran | |
| 5,524,568 A * | 6/1996 | Bobst | 114/289 |
| 6,357,374 B1 * | 3/2002 | Moore et al. | 114/67 A |

FOREIGN PATENT DOCUMENTS

| | | |
|---|---|---|
| EP | 0 894 705 A2 | 3/1999 |
| WO | WO 91 01247 | 2/1991 |

OTHER PUBLICATIONS

International Search Report for International Application No. PCT/US 03/12950, Nov. 13, 2004.

Fontaine, A.A., et al., "The Influence of the Type of Gas on the Reduction of Skin Friction Drag by Microbubble Injection," Experiments in Fluids, Springer-Verlag, vol. 13, No. 2/3, pp. 128-136, 1992.

* cited by examiner

*Primary Examiner*—Stephen Avila
(74) *Attorney, Agent, or Firm*—Dillon & Yudell LLP

(57) ABSTRACT

A submerged surface is created, either as an add-on application or as an integral part of the submerged structure, having an array of closely spaced small bubble-filled holes which cover a large fraction of the wetted surface area. The viscous drag on the bubbles is much smaller than that on the surrounding solid surface and the net drag on the entire submerged surface is less than that on an equivalent solid surface.

40 Claims, 3 Drawing Sheets

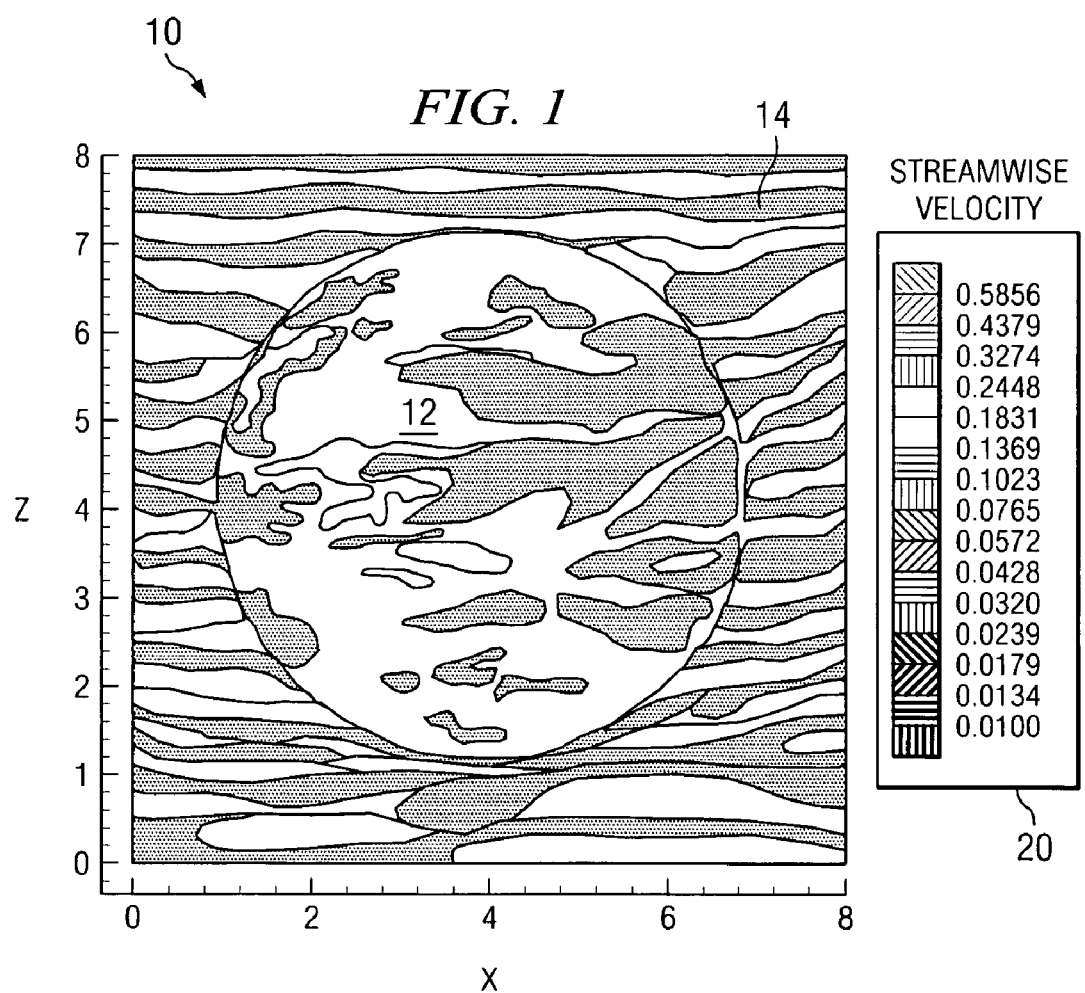

METHODS FOR REDUCING THE VISCOUS DRAG ON A SURFACE AND DRAG REDUCING DEVICE

CROSS-REFERENCE TO RELATED APPLICATION

This application is related to Provisional Application Ser. No. 60/375,878 entitled "A METHOD FOR REDUCING THE VISCOUS DRAG ON A SUBMERGED SURFACE," by David B. Goldstein, filed Apr. 26, 2002, the entirety of which is incorporated herein by reference. This application claims priority of the aforementioned related provisional application.

TECHNICAL FIELD

The present invention relates generally to the reduction of viscous drag on solid surfaces and, particularly, to applications which may involve reducing the drag on submerged or semi-submerged fresh water or ocean-going vessels.

BACKGROUND OF THE INVENTION

Development of different means of boundary layer control, particularly as applied to viscous drag reduction, are essential to future development in the fields of ship design, aerodynamics, heat transfer, flow/structure interactions, and acoustics. For most engineering applications, a turbulent boundary layer in the fluid adjacent to a solid surface is the dominant source of the viscous drag. This boundary layer is characterized by swirling, unsteady, seemingly random motion near the surface. Ultimately though, all of the viscous drag on a surface occurs through the viscous activity immediately adjacent to the surface.

Many approaches have been tried for reducing turbulent viscous drag. For applications in water, chemical additives have been found to be particularly promising over the last half century although the true mechanism by which they reduce drag remains debatable. The major problems with such additives are that they must be carried and replenished and there remain concerns about toxicity of additives.

Similarly, the process of micro-bubble cloud injection has been found to dramatically reduce drag but an incontestable mechanism for such reduction has not been discerned. Moreover, the energy cost of generating or injecting the bubbles may not be recovered from the drag benefits.

It has been found experimentally that passive surface textures (e.g. riblets) can reduce the drag on a surface by five to ten percent. However, riblets as well as other very small scale surface textures (e.g., LEBUs) suffer from the problem of biofouling in practice and, anyway, appear limited to only a few percent improvement benefit at best.

There is also much current interest in arrays of active flow manipulators; jets and suction holes, dynamically protruding bumps, flaps, etc. Arrays of micro-electro-mechanical systems (MEMS) elements have been manufactured with various techniques and have been used to measure surface shear stress distributions in fully turbulent boundary layers. The inventor is not aware of any such active flow control devices for drag reduction that have been successfully tested in a realistic application. For sea water application, electromagnetic forcing with arrays of pulsed actuators have also recently been explored.

Therefore, an improved method of reducing the viscous drag on a submerged surface would provide numerous advantages.

SUMMARY OF THE INVENTION

Water flow over a solid surface causes viscous drag due to the no-slip condition: the water must take on the velocity of the surface at the surface. At an air/water interface, however, the water can flow only slightly impeded by the no-slip condition with respect to the moving air on the other side. Based on this observation, it is proposed to trap bubbles in small closely-spaced pits in a submerged surface to reduce the net drag on the surface. The bubbles are held in the pits by surface tension and, perhaps, by active air pressure control in each pit. The turbulent boundary layer over the surface is then expected to experience nearly shear-free motion over each of the low profile exposed bubble tops.

Preliminary direct numerical simulations of a turbulent boundary layer flow over an array of shear-free spots lend strong support to this contention: drag reductions of 30% were readily attainable. Preliminary experiments indicate that slip does occur over the bubbles and illustrate the nature of the near-bubble flow. Such experiments with flow visualization using dye and hydrogen bubbles also provide a qualitative picture of the flow changes caused by the bubbles. A simple experiment to examine the effect of such bubbles on the net drag of a flat plate is under way. Preliminary results show local reductions in drag on a surface.

The invention has the potential to provide large drag reductions, comparable to those obtained with bubble cloud or polymer/surfactant injection, but without the large power input required for bubble cloud injection or the need to carry or generate chemical injectants.

BRIEF DESCRIPTION OF THE DRAWINGS

The above and other advantages, including specific embodiments, are understood by reference to the following detailed description and the attached drawings in which:

FIG. 1 illustrates the instantaneous contours of streamwise velocity just above a plate having a slip bubble in it. Flow is from left to right. Note how the streamwise streaks over the surrounding solid surface appear as in an ordinary turbulent boundary layer while over the bubble the flow accelerates (from left to right) to reach quite a high speed just before it abruptly decelerates near the right hand edge of the bubble;

FIGS. 2a–2f illustrate different possible bubble/cavity cross sectional shapes;

DETAILED DESCRIPTION OF THE PREFERRED EMBODIMENTS

A Trapped Bubble Array

Figure 2A:
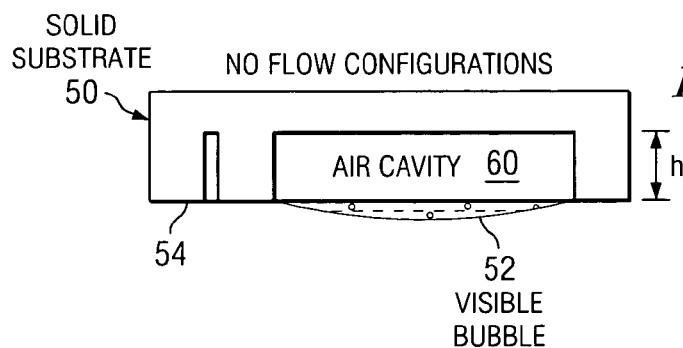

Described in this section is the Trapped Bubble Array (TBA) concept with numerical and experimental results to date. It should be understood, however, that the principals of the TBA concept may be extended to other applications.

Consider the following gedanken experiment. We submerge a horizontal flat plate in a water channel and measure the drag on it. We may use a mechanical force balance or measure the velocity profile and perform a momentum balance computation. The flow develops a simple growing boundary layer from the leading edge.

Now suppose we drill a hole up into the bottom of the plate (but not all the way through) and, using a syringe, inject enough air into the hole so that the bubble capping the hole is virtually flush with the flat plate surface. Will the drag on the plate with the hole be larger or smaller or the same as the drag on the smooth plate? It is suggested here that since the air/water interface is nearly free of shear stress in the water, the net drag will be lower. That being the case, one can dramatically reduce the viscous drag on a surface by boring many such holes and filling each with an air bubble.

Could the Drag Reduction be Large?

Suppose the flow were slow and the hole area were really large, nearly the size of the plate itself. Moreover, suppose the hole was very deep into the plate so even though there is some air circulation in the (huge) bubble cavity, it would create negligible drag on the water surface. Since the viscous drag on the plate would be roughly proportional to the SOLID plate area exposed to the water flow (raised to some suitable exponent), the drag would be much reduced.

Of course, having a huge hole in the bottom of, say, a ship to reduce drag is not suitable. But the argument does serve to illustrate that at one extreme, drag reduction should be appreciable. Presumably small holes would be necessary under a high speed boundary layer since for large bubbles the bubble interface will become unstable and splash around. A small bubble, however, should be held stiffly in place by surface tension.

Moreover, since the bubbles are held in place at their perimeters by surface tension, the bubble radius of curvature is large. With a large radius of curvature, the internal pressure should be small and gas loss due to diffusion consequently weak.

The inventor has completed some preliminary computational studies which suggest that large drag reductions are possible. Turbulent channel flow was directly simulated on a computer. One channel wall is an ordinary flat no-slip surface while the opposing no-slip wall has a circular hole over which a shear-free boundary condition is applied. Since the flow is doubly periodic in the streamwise and cross-flow directions, the simulation can be used to directly compare the flow over a periodic array of shear-free bubble caps against that over a simple flat surface.

FIG. 1 shows an instantaneous realization, denoted generally as 10, of the streamwise velocity, indicated in table 20, just above a bubble 12 in a bubble array. Ordinary low speed streaks are seen beside the bubble 12. Directly over the bubble 12 the flow rapidly accelerates from rest at the (left) upstream edge to a maximum value just upstream of the trailing edge. Upon re-attaching to the solid surface 14, the flow again comes to rest. That flow deceleration upon reattachment leads to large local viscous drag. Over all, however, this particular simulation produced a drag reduction of about 25% on the bubble wall 12 as compared to the opposing flat wall 14.

Preliminary experiments in a low speed water channel have been done of laminar flow over a 0.75 inch bubble in a flat plate. The air flow within the bubble was visualized with smoke and found to exhibit weak three-dimensional circulation patterns. Flow of the water over the bubble surface was visualized with dye injected into the water. It appeared that the dye did in fact move more swiftly over the bubble than over the surrounding flat wall. This suggests that there was less drag over the bubble. Finally, the water velocity profile was examined in great detail over the bubble using a laser Doppler anemometer capable of high spatial resolution.

There was clear evidence of velocity slip over the bubble surface as initially suggested by the earlier numerical simulations.

Further experiments are presently underway to actually measure the viscous drag on a flat plate having hundreds of bubbles. In a different experiment a 15"×22" Lucite plate with an array of 210 half inch holes on the lower surface is suspended from a trapeze and the plate deflection is measured to determine the net drag. The LDA is also used to obtain the drag via a momentum balance. In the best case, perhaps an 11% drag reduction compared to the plate with the holes covered was obtained. 11% was also the area of the exposed bubble surface. However, there were too many experimental uncertainties and a better machine 15"×40" plate with a perforated stainless steel insert having O $(10^4)$ ⅛" bubbles on the lower side is just now being tested. The trapeze can again by used or, by taping over one side of the bubble surface, the LDA can be used to obtain a side-by-side direct comparison of the boundary layers and wakes. Very preliminary results indicate a 30% drag reduction but that number may need to be revised over the next few weeks.

But Would the Generic Concept Really Produce Lower Drag? What Could Prevent a Drag Reduction?

First, the bubble surface might not be sufficiently flush so that there develops net pressure drag on the bubble. Second, since the bubble surface will be moving, it will induce an internal flow in the air in the hole. This internal flow will be viscously damped and that will lead to an interface which is not shear free. Third, for small bubbles, surface contamination may accumulate and lead to a non-shear-free interface. Fourth, even if the bubbles create an effective shear-free interface, a periodic array of shear-free spots on the surface may alter the turbulent boundary layer in such a way as to hugely increase the drag on the remaining exposed metal structure. These objections all are worth investigating.

Can We Obtain a Quantitative Idea of How Much Drag Reduction May be Possible?

With reference to FIGS. 2A–2F, a simple experiment with holes in a solid (Lucite) block 50 demonstrates that a small bubble 52 can be suitably made to lie nearly flush with a flat surface 54 bounding a flow. The inventor has examined a few different cavity shapes. A cavity depth, "h", about equal to or somewhat greater than the bubble diameter, "d", is believed to be optimal as shown in FIG. 2. If h is too small there will be appreciable gas drag on the bubble film. Cavities deeper than d do not provide much more benefit in terms of lower gas drag but do weaken the substrate. According to one known class of embodiments, the cavity depth h is 40% as large as the cavity diameter d. If the cavity width, w, is much greater than d, the bubbles must be far apart and more solid material is exposed to the flow. More exposed solid reduces the overall drag benefit which comes from having a large part of the surface covered by bubbles. Hence, d~I~w is expected to produce the lowest drag surface.

Figure 2B:
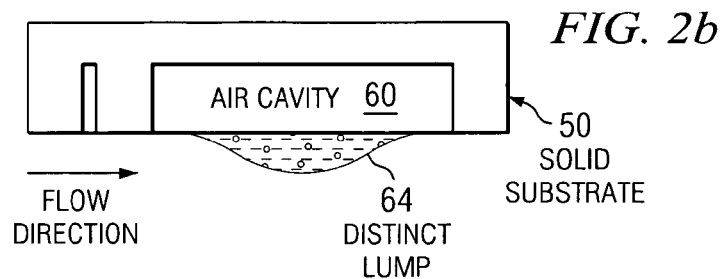

FIGS. 2a and 2b indicate two configurations of round, flat-bottomed cavities 60 holding a bubble when there is no flow: the bubbles 52, 64 are simply shaped and convex downward as one would expect. Note that the figures are drawn roughly to the scale of the experiment performed. If the lucite sample is turned upside down so the bubble is hydrostatically unstable, the large bubble quickly escapes from its cavity while the small bubble remains in place, held there by surface tension at the cavity lip.

Figure 2C:
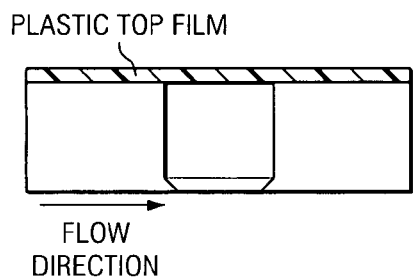
Figure 2D:
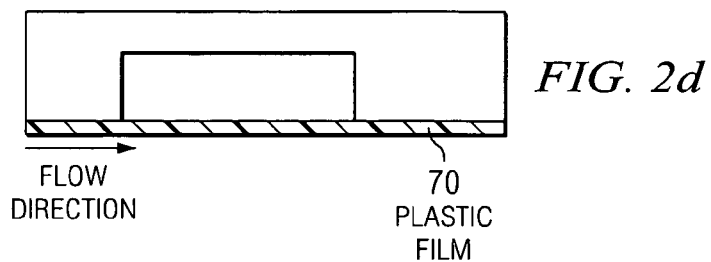
Figure 2E:
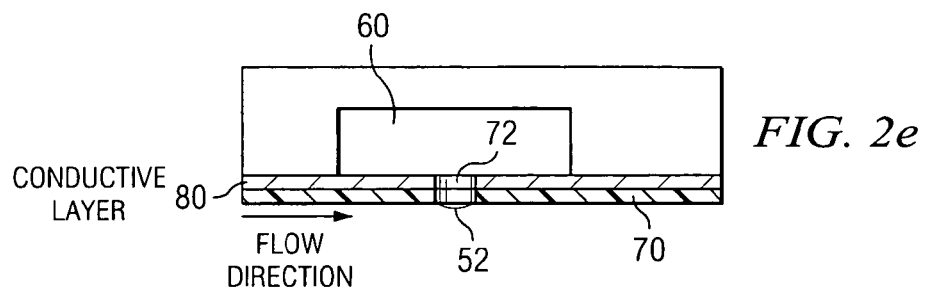
Figure 3:
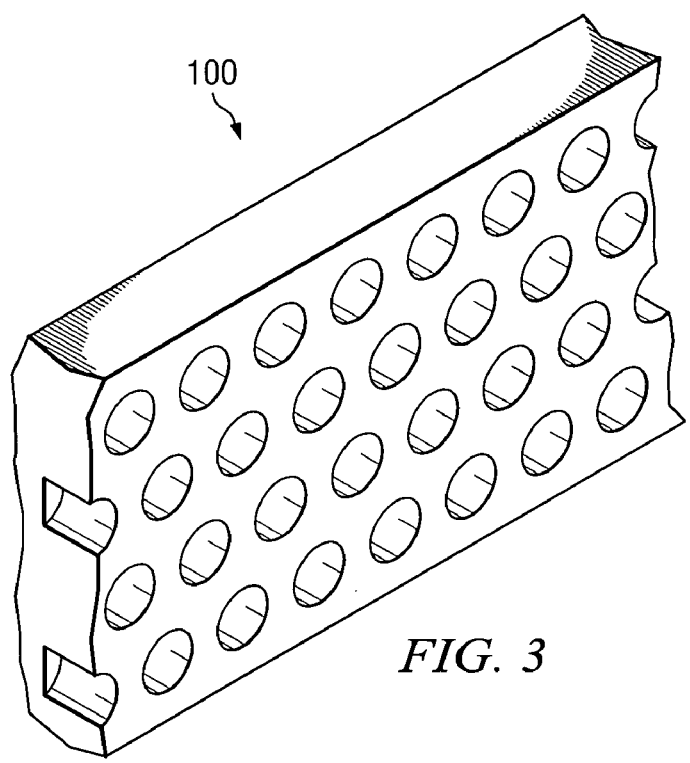
FIG. 3 is a photo showing a test article with a large number of flush bubbles held in holes of the type seen in FIGS. 2a, 2b and 2d. The hole diameters are ⅛th inch. The substrate is an aluminum perforated plate backed by a sticky tape. Note that the bubbles remain essentially flush even though the substrate is held roughly vertical. That is, the bubbles do not rise out and are held in place by surface tension. The water is not flowing.
Figure 4:
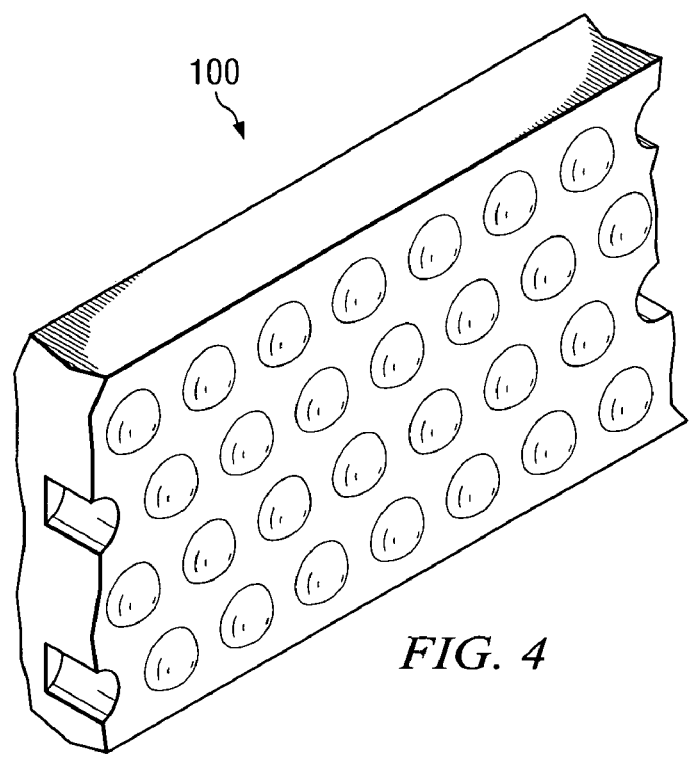
FIG. 4 is a photo showing another view of the test article of FIG. 3.

FIGS. 3 and 4 are photographs of a TBA in an aluminum plate, denoted generally as 100, in a similar configuration illustrating bubble stability and shape. If the lucite sample is held bubble-side down as shown in FIG. 2c, and there is a flow below the surface of ~3 ft/s, little is seen to happen to a small bubble. The large bubble becomes distinctly humped. This hump likely results from the speeding up of the flow over the slip bubble interface and the resulting relative pressure drop. There is no hump obvious over the smaller cavity bubble but perhaps it requires closer examination.

Small holes are able to retain their bubbles quite well. A clean sharp cavity lip is important and the preferred cavity types seen in FIGS. 2d and 2e seem able to hold the bubbles better than the square-sided cavities of FIGS. 2a, 2b, and 2c. This improvement in the preferred type may occur since, for the bubble to retreat slightly into the FIG. 2d or FIG. 2e cavity, its perimeter must increase dramatically and surface tension inhibits this.

Small holes of these configurations retain their bubbles whether the sample is held inverted or even under separated turbulent flow. Moreover, many smaller bubbles are to be preferred over fewer large ones because large bubbles are more subject to shear- and fluctuation-induced oscillation and instability. Surface tension holds smaller bubbles rigid. Smaller holes of a size ~1 mm will likely be necessary under the most turbulent, high-shear, applications. Such small bubbles are better retained under separated flows as well.

It is anticipated, however, that the TBA technique will be most profitably applied on the forward portion of a submerged body where the boundary layers are thin and the shear stress greatest. The TBA concept is expected to be most useful for reducing friction drag and not to greatly effect the wave drag and form drag which, together, are usually less than the friction drag on fast clean surface ships. Hence, if the TBA reduces the friction drag by half, the total drag on the submerged portion of a surface ship will drop by ~25% while on a submarine or torpedo the drag would drop ~50%. Moreover, if the TBA concept reduces friction losses in the hull boundary layer, the flow near the solid surface will have greater momentum and an aft-mounted propellor working in the hull slipstream will become more efficient.

Regardless of cavity or hole size, the bubbles will eventually be lost if for no other reason than gas diffusion into the water. The bubbles must then be replaced. The inventor has tested a concept using a metal or conductive metalized plastic film 70 with a hole 72 centered over the cavity 60 as shown in FIG. 2f. Essentially, a voltage is applied to the conductive metal layer 80 so that if any water enters the cavity 60, it will be electrolyzed and the cavity gas pressure will rise until the bubble 52 is restored and the water pushed out past the opening 72. Once the bubble interface returns to the cavity lip, no further power is used as there is no longer water in contact with the metal film 80. The overall idea is to create a self-refilling bubble cavity having no moving parts (e.g., no valves or tubing in the supporting substrate).

Preliminary tests with painted aluminum surfaces show that electrolysis can clearly fill the cavity. Better control of the paint distribution about the lips of the cavity will likely be important to maintaining a low profile bubble shape. One way the TBA may be used is as a multi-layer flexible panel adhered to a vessel hull in regions of high shear. Such a panel would consist at least of a substrate having cavities and an outer perforated non-conductive film. The number of holes on a given panel may vary although it is contemplated that a range of numbers may be utilized from, for example, 10 to 100 to 10000 holes per square centimeter. The back of the film and/or the interiors of the cavities would be made conductive (metalized) and electrically energized to create the trapped bubbles. Otherwise some form of MEMS feedback control of the filling process may be desirable.

It may be that non-circular holes would be optimal in that they could be more closely packed than circles. Since each of these small holes could be isolated and held dynamically at a different internal pressure, the low-drag surface could be curved around the hull of a ship on which the mean and fluctuating surface pressures vary.

The device has dramatic advantages compared to previous concepts involving an air film held in the valleys of a ribbed surface with a continuous air feed at the upstream edge (U.S. Pat. No. 5,054,412). With the present invention, since each bubble cavity is self-contained, there is no need to continuously feed air into the cavity to replace gas swept away by the water flow. Additionally, since each discrete hole is small, surface tension is sufficient to retain the bubble cap even in the presence of strong shear. Finally, the discrete holes prevent the overlying air film from becoming unstable.

While the invention has been described with reference to illustrative embodiments, this description is not intended to be construed in a limiting sense. It is intended that modifications and variations of the invention will be apparent to those of ordinary skill in the art and that such modifications and variations be part of the present invention.

For example, the technique of using gas bubbles held in small pits in a solid bounding a liquid flow may be of use in reducing the pumping power required to drive a liquid such as oil through a pipeline or to drive plastic through a forming die. Moreover, it may be suitable to form the pits simply by placing a perforated non-conductive layer simply over a conductive flat surface. Liquid thus entering the perforation pits would contact the underlying conductive bottom of the pit and be electrolysed. That is, it may not be critical exactly where in the cavity the conductor lies. All that would seem to matter would be that the electrolysis process produces fairly flat bubble surfaces and that the bubble, once suitably formed, prevents liquid contact with the electrode so that electrolysis stops and no further electrical power is consumed.

What is claimed is:

1. A method for reducing the viscous drag of a liquid flowing over a solid surface comprising the steps of:
   forming a plurality of cavities along the surface of a solid surface material, wherein the forming step is performed so the depth of the cavities is substantially equal to the diameter of the cavities;
   immersing the solid surface material in a liquid;
   filling a substantial number of the cavities with gas bubbles; and
   allowing the liquid to flow over the surface so that drag resulting from shear forces at the interface between the surface and the liquid is reduced by the presence of gas bubbles in the cavities.

2. A method for reducing the viscous drag of a liquid flowing over a solid surface comprising the steps of:
   forming a plurality of cavities along the surface of a solid surface material, wherein the forming step is performed so the depth of the cavities is larger than the diameter of the cavities;
   immersing the solid surface material in a liquid;

filling a substantial number of the cavities with gas bubbles; and allowing the liquid to flow over the surface so that drag resulting from shear forces at the interface between the surface and the liquid is reduced by the presence of gas bubbles in the cavities.

3. A method for reducing the viscous drag of a liquid flowing over a solid surface comprising the steps of:

forming a plurality of cavities along the surface of a solid surface material, wherein the forming step is performed so the depth and diameter of the cavities are related such that gas bubbles are held within the cavities primarily by the surface tension at the cavity lip;

immersing the solid surface material in a liquid;

filling a substantial number of the cavities with gas bubbles; and allowing the liquid to flow over the surface so that drag resulting from shear forces at the interface between the surface and the liquid is reduced by the presence of gas bubbles in the cavities.

4. A method for reducing the viscous drag of a liquid flowing over a solid surface comprising the steps of:

forming a plurality of cavities along the surface of a solid surface material;

immersing the solid surface material in a liquid;

filling a substantial number of the cavities with gas bubbles, wherein the filling step is performed by filling the cavities with hydrogen air;

allowing the liquid to flow over the surface so that drag resulting from shear forces at the interface between the surface and the liquid is reduced by the presence of gas bubbles in the cavities; and providing a charge about the interior of each cavity so that water making contact with a cavity is electrolyzed to release hydrogen gas that is then trapped within the cavity.

5. The method of claim 4 further comprising the step of providing electric contact terminals from the surface of each cavity to a source of current.

6. The method according to claim 4 wherein the interior surface of each cavity is held at a voltage potential with respect to the liquid and electrolysis fills each cavity with liquid dissociation products.

7. A method of forming a drag reduction device comprising the steps of forming a plurality of cavities on a solid substrate material to form a perforated surface; and attaching a first layer of conductive material over the perforated surface, such that the first layer has a pattern of openings that overlay the plurality of cavities on the perforated surface; and attaching a second layer of substantially nonconductive material over the first layer, such that the second layer has a pattern of openings that overlay the pattern of openings on the first layer;

wherein gas bubbles trapped in the cavities provide drag reducing areas at the interface between the second layer and liquid contacting the cavities.

8. The method of claim 7 wherein the cavities are formed in a concave shape.

9. The method of claim 7 wherein the cavities are formed with a flat bottom.

10. The method of claim 7 wherein the cavities are formed with a circular lip.

11. The method of claim 7 wherein the cavities are formed with a non-circular lip.

12. The method of claim 7 wherein the forming step is performed so the depth of the cavities is equal to the diameter of the cavities.

13. The method of claim 7 wherein the forming step is performed so the depth of the cavities is slightly larger than the diameter of the cavities.

14. The method of claim 7 wherein the forming step is performed so the depth and diameter of the cavities are related such that gas bubbles are held within the cavities primarily by the surface tension at the cavity lip.

15. A device for reducing the viscous drag on a surface bounding a liquid flow comprising:

a solid substrate with a surface having a plurality of cavities formed therein;

a first layer attached to the substrate and having openings which substantially overlay the cavities, the first layer made of a conductive material; and a second layer attached to the first layer opposite the substrate to form a structure bounding a liquid flow, the second layer being of a substantially nonconductive material and having openings which substantially overlay the openings of the first layer;

wherein gas bubbles trapped in the cavities provide drag reducing areas at the interface between the second layer and liquid contacting the gas bubbles.

16. The device of claim 15 wherein the cavities extend a certain depth into the solid substrate and wherein the depth of the cavities is equal to the diameter of the cavities.

17. The device of claim 15 wherein the cavities extend a certain depth into the solid surface and wherein the depth of the cavities is slightly larger than the diameter of the cavities.

18. The device of claim 15 wherein the cavities have a depth and diameter of the related such that air bubbles are held within the cavities primarily by the surface tension at the lip of each cavity.

19. The device of claim 15 wherein the cavities are concave in shape.

20. The device of claim 15 wherein the cavities have a flat bottom.

21. The device of claim 15 wherein the cavities have a circular lip.

22. The device of claim 15 wherein the cavities have a non-circular lip.

23. A drag reduction device made with the method of claim 7.

24. A method for reducing the viscous drag of a liquid flowing over a solid surface comprising the steps of:

forming a plurality of cavities along the surface of a solid surface material;

immersing the solid surface material in a liquid, wherein the immersing step is performed so that the solid surface material is immersed in fuel;

filling a substantial number of the cavities with gas bubbles; and allowing the liquid to flow over the surface so that drag resulting from shear forces at the interface between the surface and the liquid is reduced by the presence of gas bubbles in the cavities.

25. A method for reducing the viscous drag of a liquid flowing over a solid surface comprising the steps of:

forming a plurality of cavities along the surface of a solid surface material;

immersing the solid surface material in a liquid;

filling a substantial number of the cavities with gas bubbles, wherein the filling step is performed by an independent pressure regulator; and allowing the liquid to flow over the surface so that drag resulting from shear forces at the interface between the surface and the liquid is reduced by the presence of gas bubbles in the cavities.

26. A method for reducing the viscous drag of a liquid flowing over a solid surface comprising the steps of:
   forming a plurality of cavities along the surface of a solid surface material;
   immersing the solid surface material in a liquid;
   filling a substantial number of the cavities with gas bubbles, wherein the filling step is performed so that each cavity is controlled by a micro electrical mechanical system; and
   allowing the liquid to flow over the surface so that drag resulting from shear forces at the interface between the surface and the liquid is reduced by the presence of gas bubbles in the cavities.

27. A method for reducing the viscous drag of a liquid flowing over a solid surface comprising the steps of:
   forming a plurality of cavities along the surface of a solid surface material, wherein the depth of the cavities is substantially equal to the diameter of the cavities;
   filling a substantial number of the cavities with gas bubbles such that the gas bubbles are substantially trapped in the cavities and drag resulting from shear forces at the interface between the surface and the liquid is reduced by the presence of gas bubbles in the cavities.

28. A method for reducing the viscous drag of a liquid flowing over a solid surface comprising the steps of:
   forming a plurality of cavities along the surface of a solid surface material, wherein the depth of the cavities is larger than the diameter of the cavities;
   filling a substantial number of the cavities with gas bubbles such that the gas bubbles are substantially trapped in the cavities and drag resulting from shear forces at the interface between the surface and the liquid is reduced by the presence of gas bubbles in the cavities.

29. The method of claim 27, wherein gas bubbles are held within the cavities primarily by the surface tension at the cavity lip.

30. The method of claim 27 wherein the gas bubbles are substantially all hydrogen gas.

31. The method of claim 30, wherein filling the cavities with gas is accomplished when water makes contact with the cavities.

32. The method of claim 31 wherein the interior of each cavity is charged so that water making contact with a cavity is electrolyzed to release the gas bubbles.

33. The method of claim 32 further comprising the step of providing electric contact terminals from the surface of each cavity to a source of current.

34. The method according to claim 33 wherein the interior surface of each cavity is held at a voltage potential with respect to the liquid and electrolysis fills each cavity with liquid dissociation products.

35. The method of claim 28, wherein gas bubbles are held within the cavities primarily by the surface tension at the cavity lip.

36. The method of claim 28, wherein the gas bubbles are substantially all hydrogen gas.

37. The method of claim 36, wherein filling the cavities with gas is accomplished when water makes contact with the cavities.

38. The method of claim 37 wherein the interior of each cavity is charged so that water making contact with a cavity is electrolyzed to release the gas bubbles.

39. The method of claim 38 further comprising the step of providing electric contact terminals from the surface of each cavity to a source of current.

40. The method according to claim 39 wherein the interior surface of each cavity is held at a voltage potential with respect to the liquid and electrolysis fills each cavity with liquid dissociation products.

* * * * *